June 4, 1929.  W. L. WALKER  1,715,395
SOUND RECEIVING DEVICE FOR SUBMARINE SIGNALING
Filed April 25, 1925  7 Sheets-Sheet 1

Fig. 1.

INVENTOR.
WILLIAM L. WALKER.
BY Sheffield & Betts.
HIS ATTORNEYS

June 4, 1929.  W. L. WALKER  1,715,395
SOUND RECEIVING DEVICE FOR SUBMARINE SIGNALING
Filed April 25, 1925  7 Sheets-Sheet 2

INVENTOR.
WILLIAM L. WALKER.
BY Sheffield & Betts
HIS ATTORNEYS

June 4, 1929.  W. L. WALKER  1,715,395

SOUND RECEIVING DEVICE FOR SUBMARINE SIGNALING

Filed April 25, 1925   7 Sheets-Sheet 4

INVENTOR.
WILLIAM L. WALKER.
BY
Sheffield & Betts
HIS ATTORNEYS.

June 4, 1929.  W. L. WALKER  1,715,395
SOUND RECEIVING DEVICE FOR SUBMARINE SIGNALING
Filed April 25, 1925  7 Sheets-Sheet 5

INVENTOR.
WILLIAM L. WALKER.
BY
Sheffield & Betts
HIS ATTORNEYS

June 4, 1929.  W. L. WALKER  1,715,395
SOUND RECEIVING DEVICE FOR SUBMARINE SIGNALING
Filed April 25, 1925  7 Sheets-Sheet 6

INVENTOR.
WILLIAM L. WALKER.
BY Sheffield & Betts
HIS ATTORNEYS

June 4, 1929.  W. L. WALKER  1,715,395
SOUND RECEIVING DEVICE FOR SUBMARINE SIGNALING
Filed April 25, 1925  7 Sheets-Sheet 7

INVENTOR.
WILLIAM L. WALKER.
BY Sheffield & Betts
HIS ATTORNEYS

Patented June 4, 1929.

1,715,395

UNITED STATES PATENT OFFICE.

WILLIAM L. WALKER, OF NEW YORK, N. Y., ASSIGNOR TO WALKER SIGNAL & EQUIPMENT CORPORATION, A CORPORATION OF DELAWARE.

SOUND-RECEIVING DEVICE FOR SUBMARINE SIGNALING.

Application filed April 25, 1925. Serial No. 25,795.

Generally stated, my invention relates to devices for receiving sound vibrations constituting signals transmitted through natural media, such as air and water. Said invention, however, is particularly adapted for use in submarine signaling and comprises a receiving chamber usually termed an "ear", adapted to be attached to the inner surface of the skin or hull of a ship or vessel. Said ear is adapted to contain microphone receivers by which the received signals are converted into alternating electric currents and transmitted to telephone receivers located in the pilot house or other convenient controlling points on the ship.

Various features of the apparatus used in conjunction with the present invention have been included in prior patent applications filed by me in the United States and foreign countries. The present invention, however, relates to improved features of construction and arrangement of the parts whereby control, repair, replacement and simplicity of arrangement are greatly facilitated. The present form of my invention relates generally to the type of sound receiving ear for ships, as described and claimed in my prior United States application, Serial No. 468,611, filed May 11, 1921.

Certain improvements have been incorporated in the present invention which will be hereafter more fully described and pointed out in the appended claims. As indicated by said prior application, the present invention relates to sound receiving devices or ears, in which a resilient diaphragm is inserted through an opening in the hull of a ship with which it has water-tight contact, the ear being so arranged that it will approximate in resonant qualities the frequency or period of vibration of the principal sound signals to be received, although it will at the same time be responsive to other signals of different frequency. This construction greatly increases the distance from which sound signals may be received, such as from submarine bells, oscillators and other similar vibration producing devices, and obviates the construction heretofore used to a large extent, in which a tank containing water has been attached to the inner surface of the hull or skin of the ship, said tank enclosing microphones which are surrounded by the water and to which the sound is conveyed through the entire thickness of the skin of the ship or the armor of a war vessel, which naturally greatly reduces and dissipates the vibrations which strike the outboard side of the hull.

One of the principal objects of the present invention is to so arrange the casing which contains the microphonic ear that access may be had at all times to the interior of the casing, for the purpose of adjusting and repairing parts enclosed therein.

A further object of the present invention is to so proportion the dimensions of the ear that the space enclosed thereby will be made resonant to the principal signals received, whether said ear contains air or other gases or whether the same may contain liquids, such as water or oil. Obviously, if the ear is designed to contain liquids, the dimensions thereof will have to be made somewhat larger, particularly in length, in order to correspond to the resonant qualities of such liquids, according to principles well known in the art. In such cases where it may be desired, on account of certain conditions involved in particular adaptations of my invention, the chamber enclosed within the ear may be evacuated to a greater or lesser degree of vacuum. Furthermore, it may be found desirable to produce a fluid pressure within the chamber, which fluid pressure may be of such an amount as to counter-balance hydraulic pressure produced on the outer side of the diaphragm by the water or natural medium through which the sound is transmitted.

A further object of my invention is to arrange the microphones within the ear or receiving device in such a manner that the microphones may be placed in correct position to accommodate the various degrees of inclination of the hull of the ship, at points where it is found to be most desirable to place the microphones and receiving ears.

A further object of my invention is to provide a self-contained apparatus which may be completely manufactured and assembled at the plant or factory where the devices are made and which may therefore be shipped and installed as complete units, without the necessity of the employment of mechanics or artisans who are especially skilled in the installation of sound receiving devices of the character heretofore used.

A further object of the present invention is to provide a microphonic ear of such character that should the diaphragm become injured or broken by accident, or through other causes, so that the same would admit water from the exterior and render the microphones inoperative, the complete ear may be removed from the casing in which it is contained, without causing the ship to be placed in dry dock, and without allowing water to be admitted to the interior of the ship while the repairs or replacement are being made.

Further objects and advantages of the present invention will be apparent from the following specification when read in connection with the accompanying drawings forming a part thereof, in which the preferred form of my invention together with various modifications thereof are fully described.

Figure 1:
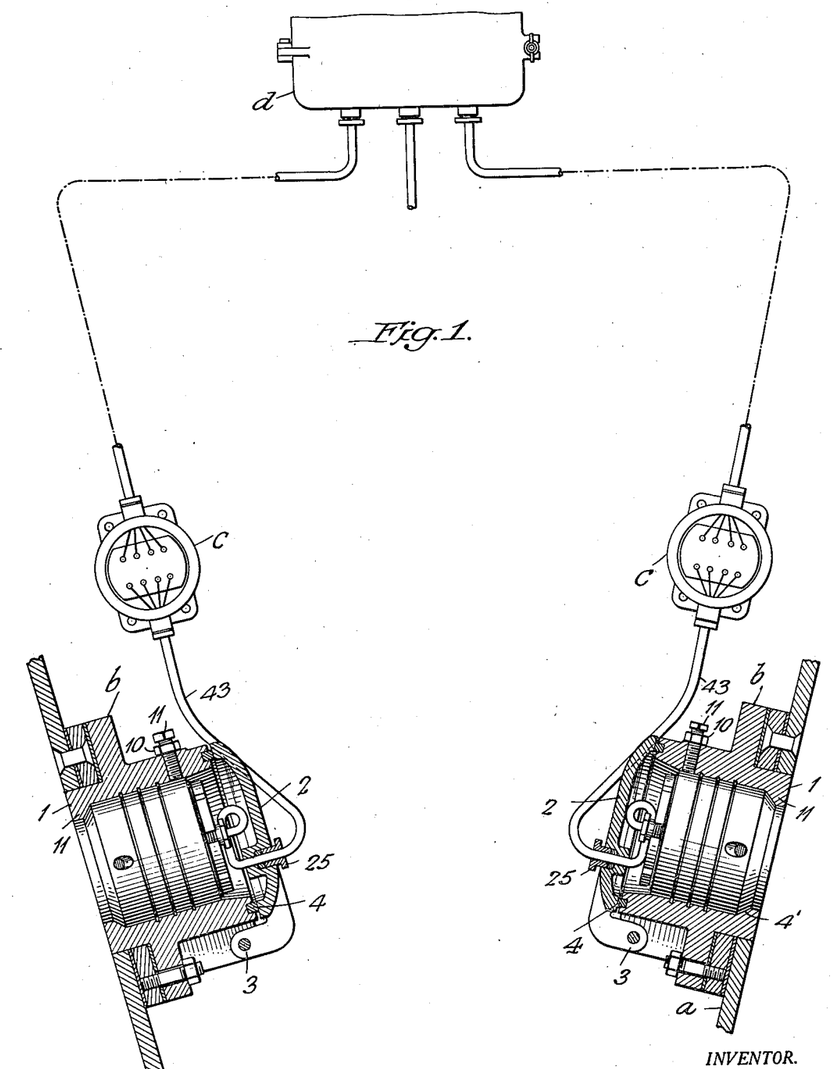
Fig. 1 is a fragmentary cross-sectional view of the hull of a vessel showing my improved ears in cross section as installed therein and indicating electric connections with the sound receiver in the pilot house or other receiving point in the ship.

Referring to the drawings, the letter $a$ in Fig. 1 indicates the skin or outer plating of the hull of a ship. $b$ indicates, generally, the ear inserted in an opening through said plating. The letter $c$ indicates a junction box of any usual or preferred type for connecting the cables carrying the wires from a sound receiving ear to the sound receiving telephones in the pilot house, which are contained in the casing indicated by the letter $d$. The parts just above referred to are identical on both the starboard and port sides of a ship and are obviously arranged at symmetrical points therein, as indicated in Fig. 1.

The outer casing 1 of the sound receiving ear may be held in position in any well known preferred way, the method indicated in Fig. 1 being an example of a satisfactory arrangement which will be apparent to one skilled in the art, without specific reference to the parts thereof, it being necessary only that the ear be held firmly in position so that the diaphragm will form a substantially smooth surface in alignment with the outer surface of the skin or plating of the ship, and so that no projections, irregularities or depressions shall be present to cause ripples or other disturbances in the water as the vessel passes through the same at high or any considerable speed. The casing 1 is preferably made cylindrical as indicated in various figures of the drawings and is adapted to receive a cover 2 which is principally hinged to the cylindrical casing, as indicated at 3, said cover being adapted to be held firmly in position by pivoted bolts 6 having nuts 7 engaging ears 2' projecting from the rim of said cover 2. The outer edge of the casing 1 is provided with a groove within which is placed a suitable packing 4, which serves to seal the cover so as to make it water and air tight when the bolts 6 are in position and the nuts 7 screwed down to hold the cover firmly against said packing. The upper wall of the casing 1 is provided with an opening through which passes a screw-threaded plug 10 which is provided with a lock nut 10' for holding the same firmly in position. This opening is provided for the purpose of inserting a locking or positioning pin hereafter to be described, and illustrated in Fig. 7 of the drawings. The outer end of the casing 1 is provided with an internal flange 11, the inner surface of which has an inclined or conical shape as indicated at 4'. The interior cylindrical surface of the casing 1 is preferably provided with a series of grooves 5 similar to those often provided in pistons and piston rings, or in similar slidable parts. The casing 1 is also provided with a plurality of screw-threaded inclined holes adapted to receive screws 16, which engage depressions in the casing 1 whereby the casing containing the microphone and the diaphragm is held firmly in position in the side of the vessel. The screws 16 are preferably provided with lock nuts as indicated at 16' which prevent accidental turning of said screws. The casing of the microphone chamber above referred to, as indicated by the numeral 9, is provided at its outer end with a flange 12 adapted to engage a flange 13 carried by the outer margin of the diaphragm 14. This diaphragm is preferably made of hard rubber or similar resilient material, although it may be of other resilient non-corrodible substances which have sufficient elasticity or resiliency to perform the function attained by the hard rubber. Suitable gaskets, such as those indicated at 15 and 15', are provided to prevent the ingress of water, the latter gasket being held in position by a suitable ring 17, which also maintains the diaphragm 14 firmly in position in the end of the casing 12. The righthand end of the casing 9 is provided with a circular recess 18 adapted to receive a cover 19. The casing 9 is also provided with a groove, in which may be seated a packing or gasket 20. The outer portion of the recess 18 is screw-threaded to receive a retaining ring 21 which, when screwed in position by means of a suitable wrench engaging the lugs 22, will firmly hold the cover 19 in position to hermetically close the end of the casing 9. The cover 19 is also provided with an opening 23, the outer end of which is adapted to receive a screw-threaded gland as indicated at 24, and through which the cable containing the lead-in wires may pass, said gland forming a stuffing box to prevent leakage from the exterior. The outer cover 2 is also provided with an opening, which receives a screw-threaded gland 25, through which the cable containing the lead-in wires may pass from the gland 24, said gland 25 also forming a second stuffing box to prevent the ingress of water and moisture.

Referring now to Figs. 2, 6, 9 and 10, mountings of the microphones of which there are preferably two may be described as follows:

A frame or base 26 is provided on each end with a screw-threaded opening, through which pass tubular screw-threaded members 27. These members are provided with suitable lock nuts 28 which hold them in the proper position. Through the opening in said tubular members there extends a pair of filaments 29 and 30 which are looped over and engage the pins 31 and 31', extending across the ends of the tubular members 27. These filaments may be and preferably are composed of phosphor-bronze, about .010" gauge wire. Although these filaments may be entirely independent of each other, they are preferably so connected as to form a substantially continuous loop, through which the pins 31 and 31' are passed as above mentioned. The central portions of the filaments 29 and 30 pass through openings in and support the lower end of a lever arm 32, which lever arm has connected with it a horizontally extending arm 33, the end of which is screw-threaded and provided with an adjustable weight or counter-balance 34. The filaments 29 and 30 provide a fulcrum or pivot for the lever 32, and by adjusting the position of the tubular members 27, the filaments may be placed under sufficient tension to support the lever and the parts carried thereby with sufficient resiliency to permit said lever to vibrate freely on said filaments. The end portions of the filaments at each side of the lever 32 are preferably twisted together, but in opposite directions, so that when placed under tension the individual strands are practically united and are placed under considerable torsional strain, without however, tending to force the lever 32 in either direction about said fulcrum. The upper end of the lever 32 is attached to a crossbar 35, upon the opposite end of which are secured the microphones 36 and 37. The lever 32 is also connected to a small horizontal bar 38, the opposite end of which is connected with the center of the diaphragm 14'. This bar serves to transmit the vibrations of the diaphragm 14' to the lever 32 and subsequently to the microphones 36 and 37 supported thereby.

Figures 2, 4, 16:
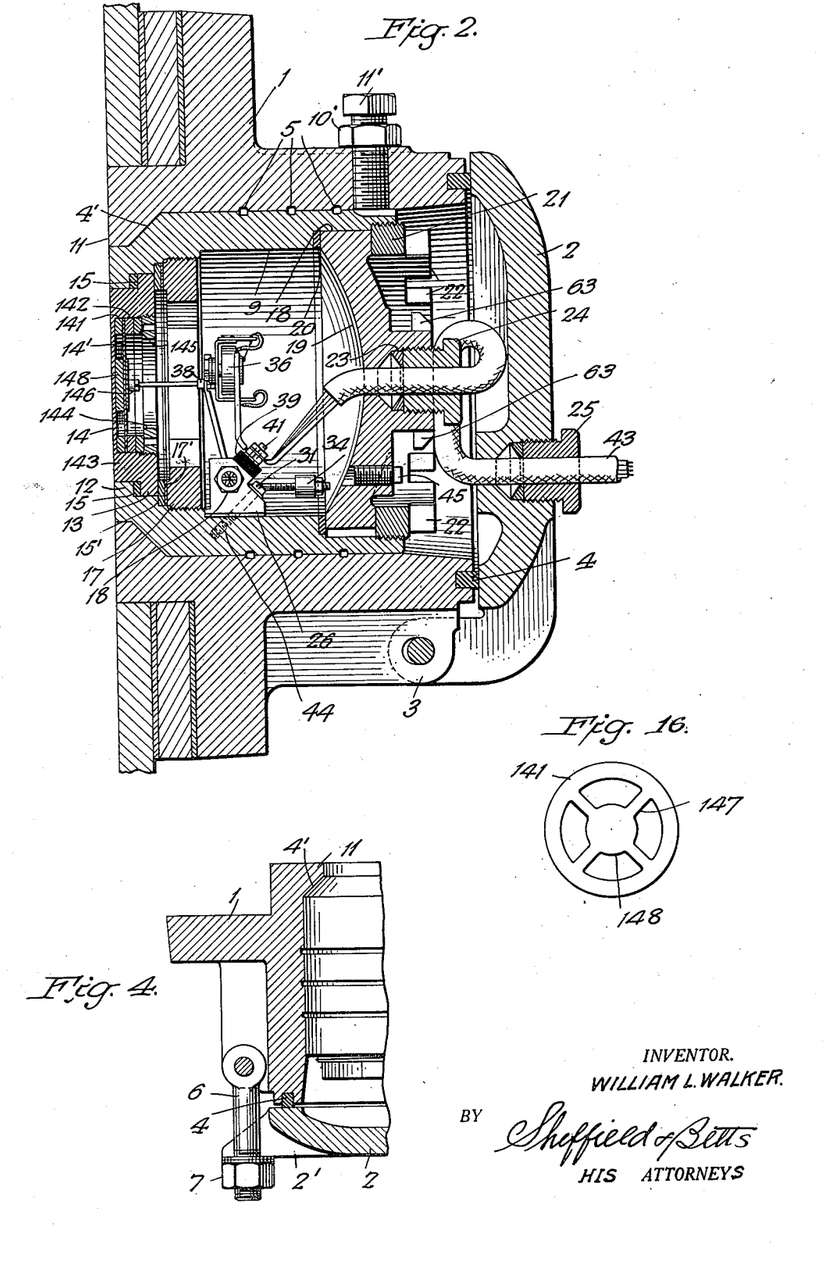
Fig. 2 is an enlarged cross-sectional view of the casing or ear indicating the arrangement of the parts which contain the microphone and receiving diaphragm.
Fig. 4 is a transverse sectional view of a portion of the microphone chamber illustrated in Fig. 3 and showing the arrangement of the cover holding bolts.
Fig. 16 is a view of the diaphragm cushion and gasket of Figs. 2 and 9.
Figure 3:
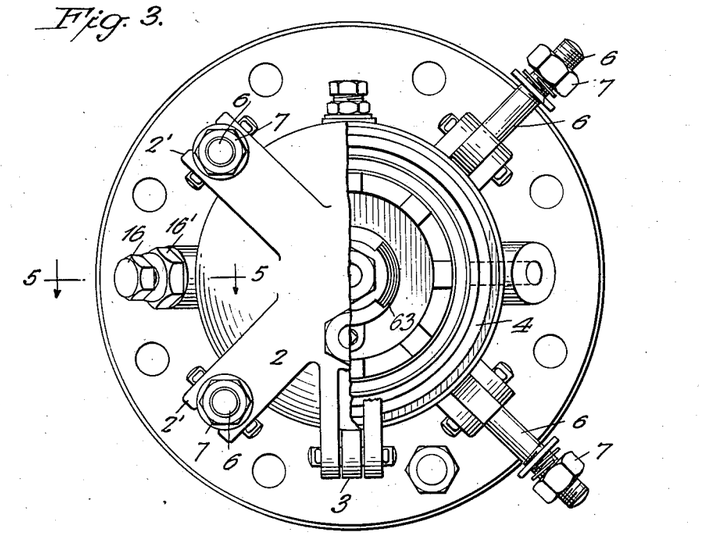
Fig. 3 is an end view, the lefthand portion of which shows the casing or ear with the cover in position while the righthand portion thereof shows the casing or ear with the cover removed.
Figure 5:
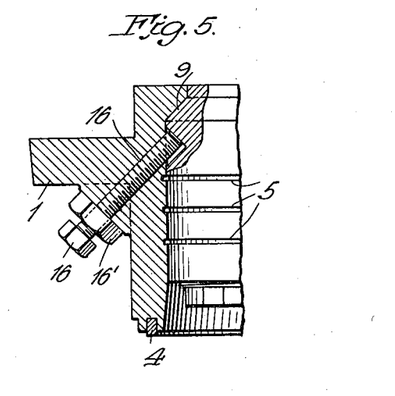
Fig. 5 is a transverse sectional view taken substantially on the line 5—5 of Fig. 3, showing the screws for holding microphone casing in position within the outer casing.
Figure 6:
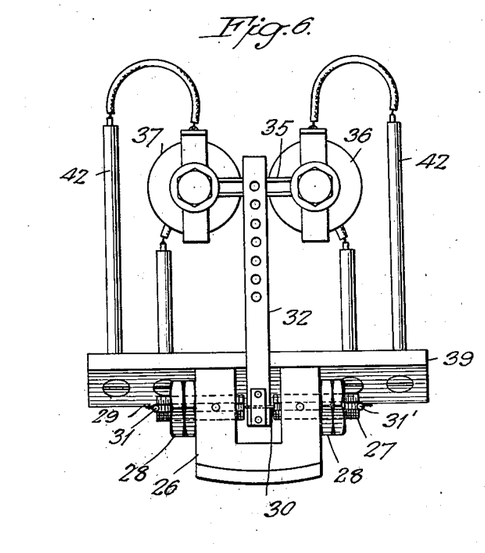
Fig. 6 is an elevation of the microphone mounting shown in Fig. 2, as viewed from the left.
Figure 9:
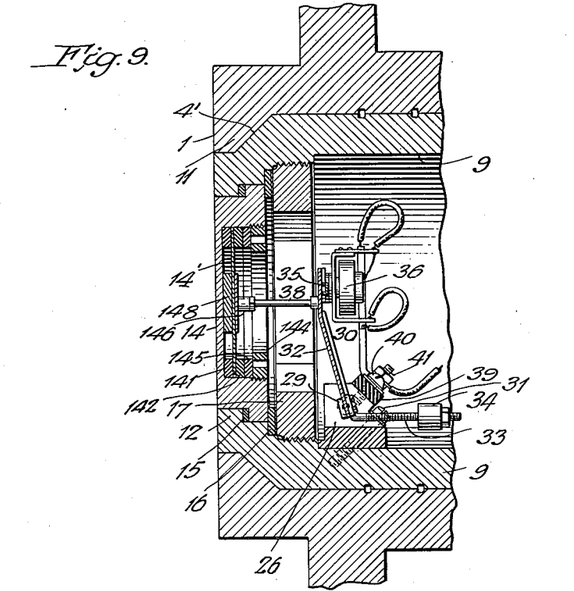
Figs. 9 and 10 indicate the method of mounting the microphones within the resonant chamber by which they are enclosed.
Figure 10:
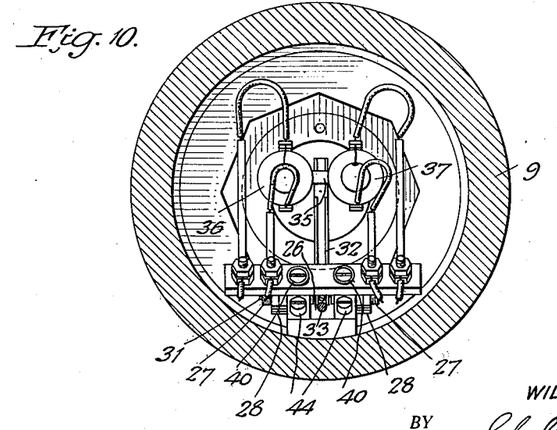

The diaphragm 14' is supported between two gaskets 141 and 142, the latter of which engages the slip ring 143. A screw-threaded retaining ring 145 holds the diaphragm 14' and the gaskets in position with adjustable pressure. The diaphragm 14' carries on its inner surface a boss 146 to which the rod 38 for operating the microphones 36 and 37 is attached. The gasket 141 is connected by radial spokes 147 (Fig. 16) with a resilient transmitting member, a cushion 148. The dimensions of this cushion together with those of the gasket engaging the diaphragms affect to a large extent the resonance of the diaphragms and increase the efficiency of the transmission of sounds to the microphones. The microphones 36 and 37 may be of any preferred form such as now known in the art, the present microphones being illustrated for the purpose of showing their relation with the other parts of the device involved in this form of my invention. The frame 26 is provided at one side with a strip of insulating material 39 which is attached to said frame by suitable screws as indicated at 40. This strip is provided, in the present instance, with four binding posts or screws indicated at 41, for the purpose of connecting the wires 42 extending from the microphones 36 and 37 to the end of the cable 43, running to the junction box c. The frame 26 is secured in position within the casing 9 by means of screws 44 which pass through the bottom of the frame and engage the casing as indicated in Fig. 2. When the receiving ear is in position for operation, the parts are assembled as indicated in Figs. 1, 2 and 9.

The inner cover 19 of the microphone chamber is provided with a screw-threaded opening adapted to receive a screw-threaded plug 45 which is provided for the purpose of allowing inspection of the microphone chamber when the outer cover 2 is removed, in order to determine whether any water has leaked into said chamber, prior to removing said inner cover, when it is desired to examine the microphones. It will be apparent that the cover 2 may be displaced, even when the cable is passing through the gland 25 by first loosening said gland to allow the cable to slip therethrough, and then upon loosening the bolts 7 said cover may be allowed to swing back thus exposing the plug 45, for the inspection above referred to. When assembling the microphone chamber prior to its insertion within the outer casing, the gasket 15 is first inserted after being covered with a layer of rubber compound, preferably comprising what is known at the present day as commercial latex and also some vulcanizing or vucanizable agent, so that the rubber will have a tendency to solidify and make it an absolutely water tight joint, without using unnecessary force to screw the clamping ring 13 in position. The use of rubber latex in this connection has been found to be most satisfactory material for obtaining an absolutely water tight joint between the diaphragm and said packing. The latex may also be applied to the sides and back of the rubber diaphragm and to other gaskets in assembling the receiving ear. The diaphragm is then inserted with its flange 13 in contact with the gasket 15. The gasket 15', slip ring 17' and retaining ring 17 are then placed in position. Said casing 9 is then inserted in the outer casing 1, so that the diaphragm and the edge of the casing is flush with said outer casing and thereby forms practically a smooth continuation of the skin of the ship. The outer surface of the casing 9 is preferably first covered with a heavy grease, preferably containing graphite to prevent leakage, to deaden undesirable vibrations and to prevent rust or corrosion.

The hole in the plating or skin of the ship to receive the outer casing 1 is, of course, necessarily cut through said plating when the ship is in dry dock, as steel cutting tools must be used to form said holes from the outside. However, after said holes have been cut and the outer casing placed in position, the casing containing the diaphragm may be removed and inserted without docking the ship.

The switch box or receiving cabinet in the pilot house, as indicated by d in Fig. 1, may be arranged in various ways to cause the microphones to transmit the received sounds to the receiving telephones in any desired or preferable way. One microphone in each of the ears is preferably matched with a corresponding microphone in the other ear. The second pair of microphones of which there is one in each ear or microphone chamber are also matched, so that in case of accident to one of the microphones, a pair of microphones comprising one microphone on the port and one microphone on the starboard side of the ship, might still be available. Other devices for controlling the intensity and volume of the electric currents of the microphones and for comparing the sound may also be provided in said receiving cabinet. However, as the present invention does not involve the switch mechanism for attaining these various results they are not described herein.

Figure 7:
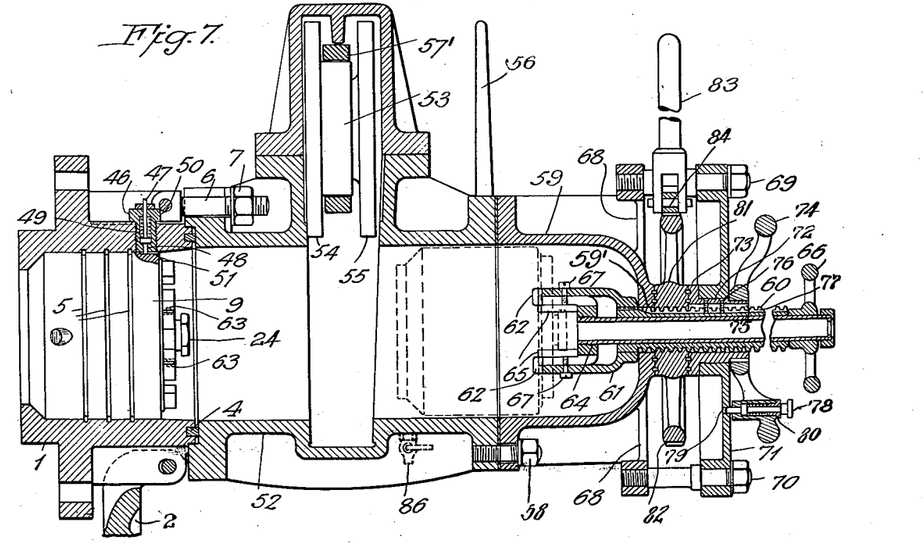
Fig. 7 is a longitudinal sectional view of the ear and of the valve casing which is applied thereto when it is necessary to remove the inner chamber containing the microphones and diaphragm.
Figure 8:
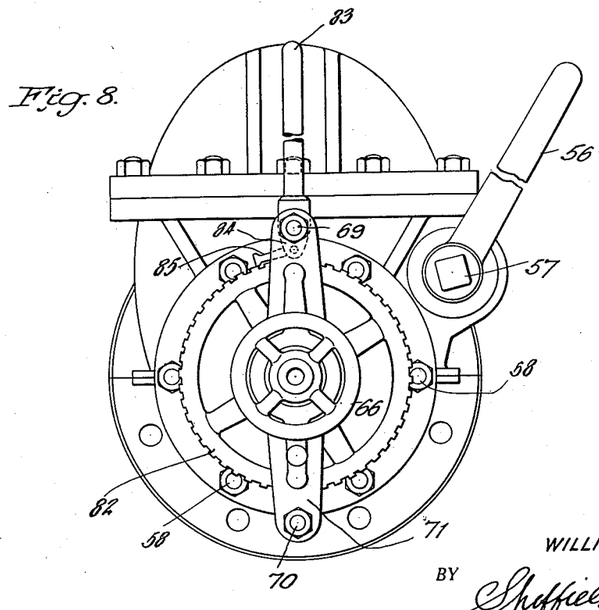
Fig. 8 is an end view of the valve mechanism illustrated in Fig. 7.

It now remains to describe the method and apparatus for removing and replacing the casing forming the microphone chamber in either of the ears. As indicated in Fig. 7, the cover shown in Fig. 2 has been swung back. It is also seen in Fig. 7 by comparing the same with Fig. 2 that the plug 10 has been removed and a hollow plug 46 substituted therefor. This hollow plug contains a central spindle 47, the lower end of which is adapted to project slightly beyond the surface of the outer casing 1 as indicated at 48. Said spindle is also forced downward by a helical spring 49 which is held in position by a cap 50. The lower end of the spindle 47 is adapted to engage in a groove 51 in the outer surface of the microphone casing 9. The latter groove 51 and the lower end 48 of the spindle 47 serve as means to determine when the microphone chamber casing has been correctly positioned within the outer casing, in order that when the retaining screws 16 are being inserted they will be sure to enter the recesses in the casing 9. Assuming then that the parts of the outer casing of the ear are arranged as shown in Fig. 7, the cylindrical casing 52 is clamped in position by the use of the bolts 6 and the nuts 7, previously used for holding the cover in position. This casing is provided with an enlarged portion adapted to contain a movable valve member 53, which comprises two discs 54 and 55 connected at their central portions but free to move slightly in relation to each other. These valve members may be operated in any well known or preferable way, but I have shown the same as being operated by the lever 56 indicated in Fig. 8. The lever 56 is mounted on the squared end of a horizontal shaft 57, the inner end of which carries an eccentric ring 57' (Fig. 7) enclosing the connecting portions between the discs 54 and 55. The connection between the horizontal shaft 57 and the eccentric ring 57' is not indicated, as this construction will be obvious to one skilled in the art, and it will be appreciated that when the lever shown in Fig. 8 is moved toward the left the valve member 53 will have moved downward so that the discs 54 and 55 will enter the enlarged portion of the casing and cover the smaller cylindrical portions so as to form a substantially water tight joint. The function of this valve will be referred to hereafter. The cylindrical casing 52 is provided with a removable housing 59 which is connected with the cylindrical portion 52 by a series of screw-threaded studs or bolts 58. This casing is preferably in the form of a cup, as indicated in Fig. 7, and is provided with an opening 59' through which passes a screw-threaded hollow spindle 60. The inner end of the screw-threaded spindle 60 is provided with a head 61, the end of which carries two segmental pieces 62, each of which extend for slightly less than 90 degrees around and on opposite sides of the head 61. These segments are adapted to enter between corresponding segments 63 on the projection forming the stuffing box which carries the gland 24. It will thus be seen that when the segments 62 are inserted between the segments 63 and the former are turned 90 degrees, the two sets of segments will engage each other so that the microphone chamber casing 9 may be drawn toward the right. The tubular spindle 60 also encloses a second tube 64 which has attached to its inner end a head carrying a pair of projections 65 and at its opposite end is provided with a hand wheel 66, by means of which said tube 64 and the projections 65 may be moved longitudinally within the tubular spindle 60. Screws 67 pass through the sides of the head 61 and engage the projections 65 thereby forming guides to prevent the said projections from moving around within the head 61, but at the same time allowing their longitudinal movement. Lateral extending brackets 68 are provided at each side of the tubular extension 59 of the cylindrical casing. These brackets are adapted to receive screw-threaded studs 69 and 70, which studs support a transverse yoke 71. The said yoke 71 is provided with a central opening through which passes a sleeve 72 having a flange 73 at its inner end and a handle 74 keyed to its outer end. Said sleeve 72 is also provided with a key 75 retained in position by screws 76 as indicated. This key fits into a keyway 77 on the screw-threaded spindle as further indicated in Fig. 7. One end of the handle 74 is provided with a locking pin 78, the inner end of which is adapted to project into an opening 79 in the yoke 71, the same being held therein by pressure of the spring 80. Between the flange 73 of the sleeve 72 and the end of the casing 59 is located the hub 81 of a ratchet wheel 82. The opening through the hub 81 is screw-threaded to correspond with the threads on the threaded spindle 60. On the stud 70 is pivoted a lever 83 having a downward projection 84 within which is pivoted a pawl 85 adapted to engage the teeth of the ratchet wheel 82. It will thus be seen that, upon rotating the ratchet wheel 82, either directly by hand or by the use of the lever 83 and pawl 85, the spindle 60 will be advanced toward the microphone chamber casing, or if turned in the opposite direction said spindle will be retracted.

Assuming now that the cylindrical casing 52 and the cylindrical casing head and their attached parts are placed in position and retained therein by the bolts 6 and 58, and it is desired to remove the microphone chamber casing 9, the procedure is as follows:

The cable 43 is first detached from the junction box c, so that the end of the cable can be pulled through the gland 25 in the cover 2. Said cover is then removed leaving the cable projecting from the gland 24 in the microphone chamber casing cover 19. The end of the cable 43 is then passed through the cylindrical valve chamber 52 and the casing thereof secured in position on the casing 1 by means of the bolts 6. The end of the cable 43 is then passed through tube 64 within the hollow spindle 60 so that it projects from the righthand end thereof. (Fig. 4.) The cylindrical head 59 is then secured to the valve casing 52 by means of the studs 58. The ratchet wheel 82 is then rotated to advance the spindle 60 toward the left, thereby carrying with it the head 61 and the segments 62 until they are in position to pass between the segments 63 on the cover 19 of the microphone chamber. The handle 74 is rotated 90 degrees until the pin 78 enters the hole 79 in the yoke 71. The segmental lips 62 of the head 61 are then behind the segments 63 on said cover 19. The projections 65 extending from the tube 64 are then pushed into the space between the segments 63 by means of the handle or wheel 66. The withdrawing mechanism for the microphone chamber casing is then locked to the cover thereof. The two retaining screws 16 on each side of the casing 1 are then slacked off or unscrewed sufficiently to be withdrawn from the sockets or recesses in the casing 9. Said casing is then drawn toward the right by rotating the ratchet wheel 82 until it is placed in the position shown in dotted lines in Fig. 7. The valve members 54 and 55 are then moved into position by using the lever 56, thereby closing the cylindrical chamber 52 and retaining the water which has followed the microphone chamber during its removal, within the lefthand portion of said valve casing 52. The water within the righthand portion of said valve casing and the cylindrical head 59 may be removed in any desired way, as through the use of a cock 86. Should the microphone chamber casing tend to stick within the outer casing 1 in cold weather or because of a more or less stiffening of the grease applied when inserting the same, it can be easily started by rotating the ratchet wheel 82 through the medium of the pawl 85 and the lever 83, by means of which much greater force may be applied to said ratchet wheel than when rotating the same directly by hand. Obviously, when the microphone chamber casing 9 has been placed in the position shown in dotted line in Fig. 7, the studs 58 may have the nuts removed therefrom thereby allowing the cylindrical head 59 to be detached. Said microphone chamber casing may then be removed from the withdrawing clutch 61 by reversing the method of attaching the same as above described.

Necessary repairs or replacements may then be made to the outer diaphragm and other parts, after which the same may be replaced within the cylindrical head 59 and the same attached to the cylindrical valve casing 52. The valves 54 and 55 are then withdrawn to the outer portion of the valve casing which will, of course, allow the water to fill the righthand portion of said casing and the housing or head 59. The microphone chamber casing 9 is then moved towards the left until it reaches a point, a small fraction of an inch inside its final position within the casing 1. If the end 48 of the pin 47 does not engage the groove 51 then the handle 74 may be turned toward the right or left until the end 48 of the pin 47 is snapped into the recess or groove 51. This will indicate that the screws and recesses are in alignment with the ends of the retaining screws 16. The casing may then be forced home toward the left as far as possible by rotating the ratchet wheel 82, after which the retaining screws 16 are screwed down tightly to retain the microphone chamber casing in its final position within the outer casing 1, so that the diaphragm 14 is flush with the skin of the ship. The plug 46 containing the spring pressed pin 47 is then removed from the casing 1 and the solid plug 10 substituted therefor. The water within the cylindrical casing 52 and the head 59 is then withdrawn through the cock 86, or in any other preferable way. Both of these casing may then be detached from the casing 1, the cable withdrawn through the tube 64 after which it is passed through the gland 25 in the cover 2. Said cover is then pulled into position and the end of the cable 43 connected with the junction box c. Thus the parts are then in position for further operation of the signaling apparatus.

Figures 11, 12:
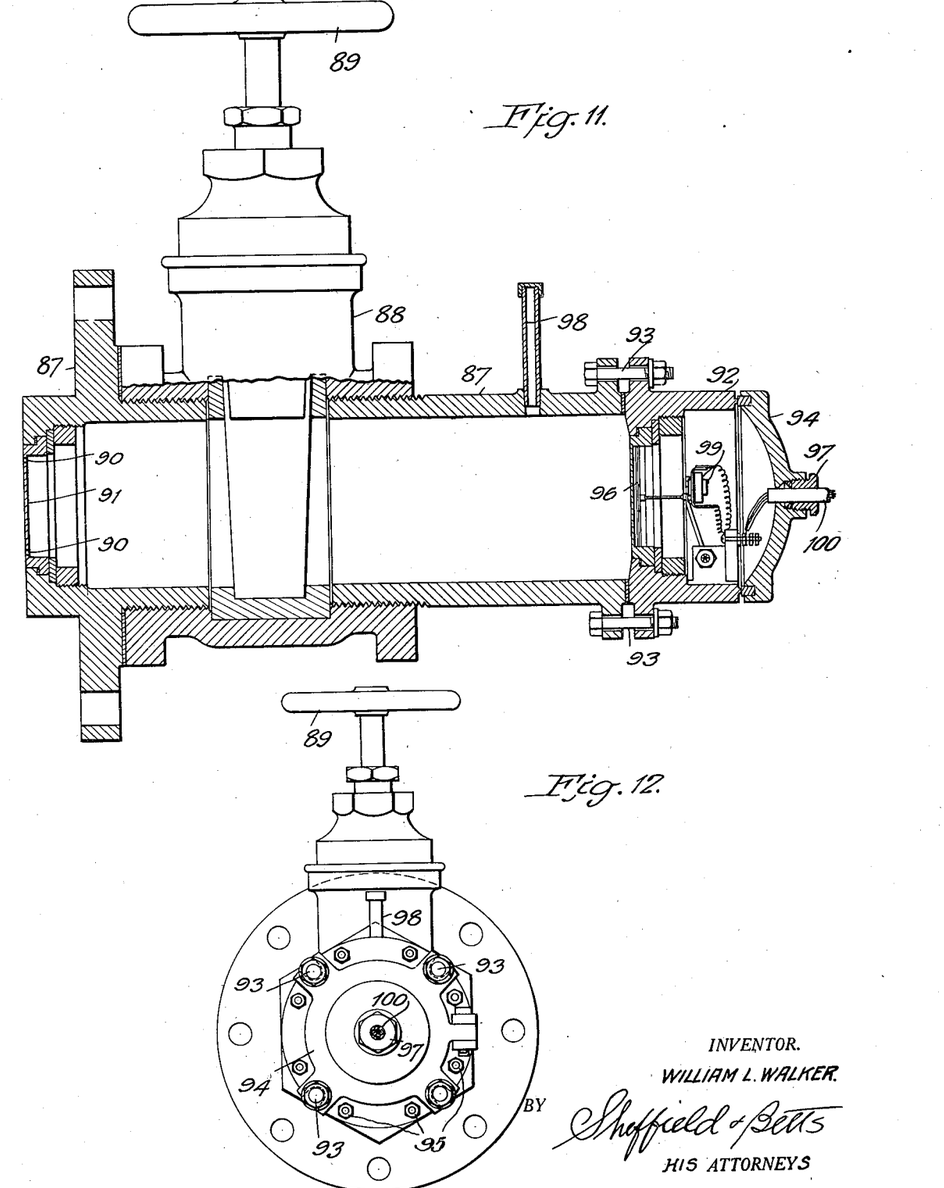
Fig. 11 is a longitudinal sectional view of a form of my improved sound receiving device in which the resonant chamber is adapted to be filled with sea water which is allowed to enter through suitable openings, through or around the diaphragm forming a portion of the skin of the ship.
Fig. 12 is an end elevation of the device shown in Fig. 11.

Referring now to Figs. 11 and 12, I have therein illustrated a modified form of the apparatus previously described. In this form of the apparatus the valve 88 is permanently connected with the outer casing 87, the valve 88 in this instance being illustrated as any standard or well known form of gate valve operated by a hand wheel 89. In this form of the device, I have illustrated the casing 87 as being of the correct length to be resonant to the desired frequency of the received signal when said casing is filled with sea water. The sea water may be admitted in any preferable way, such as providing holes 90 in the diaphragm 91, which diaphragm is retained in position in a manner previously described, but is applied directly to the end of the outer casing 87, instead of to the microphone chamber casing.

The microphone chamber casing in this form of the device is indicated by the numeral 92 and is somewhat similar in general construction and proportions to the microphone chamber casing described in connection with the first mentioned form of the device. This casing 92 is attached to the cylindrical casing 87 by means of bolts 93 and is provided with a cover 94 which is attached to the casing 92 by means of the bolts 95, or any other suitable or preferable way. The microphones and their connection with the diaphragm 96 may be arranged as described in connection with the first form of the device, or may be arranged in any other suitable way which will permit the desired operation, the connecting cable being arranged to pass through a stuffing box which is made water and moisture proof by means of the gland 97. In this form of the device, it will be obvious that, in order to gain access to the microphone chamber, it will be only necessary to remove the cover 94 and if it be found necessary to remove the casing 92 in order to substitute a new diaphragm 96, the valve 88 may be closed by rotating the hand wheel 89, after which the bolts 93 may be loosened and said casing 92 detached from the casing 87. I prefer to provide a casing 87 with a vertical tube 98, one portion of which may be transparent to allow an inspection of the height of the water carried in the casing 87. It is obvious that in this form of the device, the holes 90 may be omitted and the cylindrical chamber formed by the casing 87 may be filled with fresh water or even with oil, in which case the indicator tube 98 will always indicate the height of the water or oil within said casing. In this form of the apparatus the chamber 87 and the water therein being substantially resonant to the principal submarine signaling desired to be received, the diaphragm 91 will be vibrated by said signals which vibrations will be transmitted through the water or other liquid within the casing 87, from which the vibrations will be impressed upon the diaphragm 96 and so transmitted to the microphones 99 and thus will be carried to the receiving telephones in the pilot house through the cable 100.

Figures 13, 14, 15:
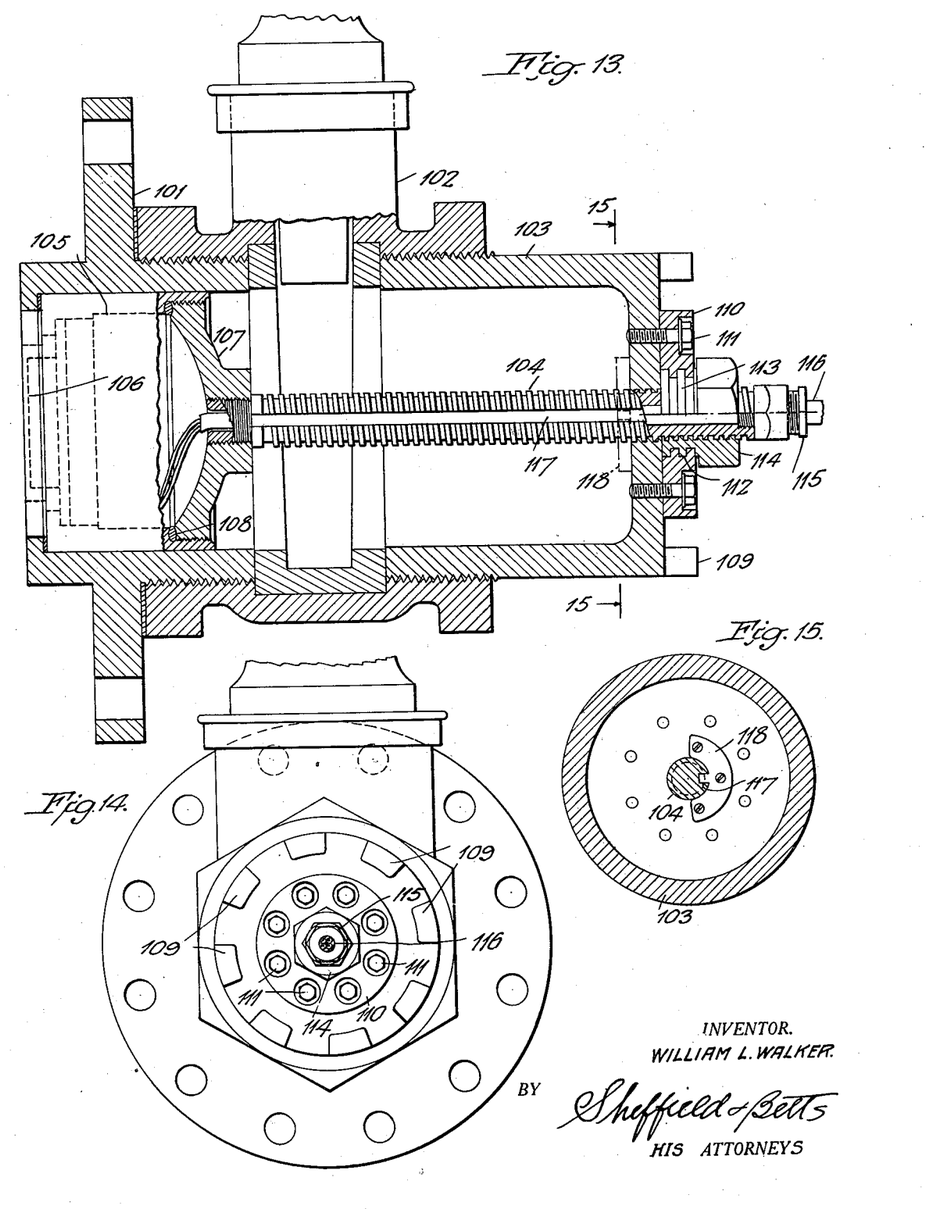
Fig. 13 is a longitudinal sectional view of a modification of my device in which the valve for closing the interior of the casing allowing removal of the microphonic chamber, is a permanent part of the ear.
Fig. 14 is an end view of the device as shown in Fig. 13, but on a slightly reduced scale.
Fig. 15 is a transverse sectional view taken substantially on the line 15—15 of Fig. 13.

Referring now to Fig. 13, I have illustrated another modification of my device which is similar in some respects to that illustrated in Figs. 7 and 8, but in which the outer casing 101 permanently carries the valve 102, the casing head or housing 103 and the screw-threaded spindle 104 for withdrawing the microphone chamber 105, to which said spindle 104 is permanently but rotatably attached. The diaphragm 106 is retained within the casing 105 in a manner similar to that described in the form of the device first above described, or in any other preferable way. The microphones are not illustrated in the present form of the device, for simplicity, of illustration. The cover 107 of the microphone chamber casing is illustrated in the present form as being connected with the casing 105 by having screw threads about its outer periphery, and is adapted to engage a packing 108 at the bottom of the screw-threaded recesses on the casing 105. The casing head 103 has a screw-threaded connection with the valve casing 102 and is provided with a series of projections 109 which may be engaged by a suitable wrench or spanner so that the said casing head 103 may be unscrewed from the valve casing 102. Said casing head 103 is also provided with a divided collar 110 secured in position on said head by means of screws 111. The inner semicircular portions of the said collar 110 are provided with one or more grooves 112 which are adapted to engage corresponding flanges 113 on a sleeve projecting from the hexagonal head or nut 114. The end of the hollow spindle 104 is provided with a gland 115 which is adapted to form a water and moisture tight connection with the cable 116 running to the microphones within the microphone chamber casing 105. The inner surface of the nut 114 is screw-threaded to engage the screw-threads on the spindle 104. It will thus be obvious that by rotating the nut or head 114 said spindle will be inserted in or withdrawn from the casing 103, the valve casing 102 and the outer casing 101. The hollow spindle 104 is provided with a keyway 117 which engages a key 118 carried by the casing head 103, as illustrated in Fig. 15.

With this form of the device the microphone chamber casing 105 may obviously be pulled toward the right when it is desired to remove the same, the valve 102 closed and then the casing head 103 unscrewed from the valve casing 102. This having been done the microphone chamber casing may be removed from the spindle 104, and after removal of the cover 107 its interior inspected and repairs made, if necessary.

Having thus described these forms of my invention it will be obvious to those skilled in the art that various other changes may be made therein without departing from the spirit and scope of the invention, the advantages of the various forms of the device being applicable to the various conditions incident to the position and surrounding structures in the vicinity of the places where the receiving ears are to be installed.

It will also be obvious that the microphones may be mounted within the microphone chamber in other ways, depending upon the preference of those using the sound receiving devices, but I have found that the method of mounting the microphones first described is very satisfactory and when used in connection with the hard rubber diaphragm described enables sound signals to be received from far greater distances than have ever before been attained.

What I claim and desire to protect by Letters Patent is:

1. Submarine signaling apparatus comprising in combination, an outer casing adapted to be applied to an opening in the hull of a ship, a second casing forming a microphone receiving chamber, a valve and casing therefor adapted to be attached to the inner end of said outer casing, a housing adapted to be attached to said valve casing, a screw passing through said housing, a clutch on the inner end of said screw adapted to engage the casing of said microphone chamber for withdrawing the same, a key for locking said clutch in operative position, and means passing through said screw for actuating said key.

2. Submarine signaling apparatus comprising in combination, an outer casing adapted to be fixed in an opening in the hull of a ship and comprising a removable cover, a microphone cell removably housed in said casing and provided with a resilient diaphragm substantially flush with the hull of the ship and with the outer end of said casing, a microphone operatively connected with said diaphragm, said cover being adapted to close the inner end of said outer casing and located adjacent the end of said microphone cell when closed, and a valve and casing therefor adapted to be attached to the inner end of said outer casing when said cover has been displaced and through which said microphone cell is withdrawn, said valve being adapted to be closed between said cell and the opening in the hull when the former is withdrawn, to permit the removal of said cell without the ingress of water, a housing adapted to be attached to said valve casing and mechanism carried by said housing adapted to be removably engaged with said microphone cell to insert and withdraw said cell into and from said outer casing.

3. Submarine signaling apparatus comprising in combination, an outer casing adapted to be fixed in an opening in the hull of a ship and comprising a removable cover, a microphone cell removably housed in said casing and provided with a resilient diaphragm substantially flush with the hull of the ship and with the outer end of said casing, a microphone operatively connected with said diaphragm, said cover being adapted to close the inner end of said outer casing and located adjacent the end of said microphone cell when closed, and a valve and casing therefor adapted to be attached to the inner end of said outer casing when said cover has been displaced and through which said microphone cell is withdrawn, said valve being adapted to be closed between said cell and the opening in the hull when the former is withdrawn, to permit the removal of said cell without the ingress of water, a housing adapted to be attached to said valve casing, a longitudinally movable bar passing through said housing and means for removably attaching said bar to said microphone cell to insert and withdraw said cell into and from said outer casing.

4. Submarine signaling apparatus comprising in combination, an outer casing adapted to be fixed in an opening in the hull of a ship and comprising a removable cover, a microphone cell removably housed in said casing and provided with a resilient diaphragm substantially flush with the hull of the ship and with the outer end of said casing, a microphone operatively connected with said diaphragm, said cover being adapted to close the inner end of said outer casing and located adjacent the end of said microphone cell when closed, and a valve and casing therefor adapted to be attached to the inner end of said outer casing when said cover has been displaced and through which said microphone cell is withdrawn, said valve being adapted to be closed between said cell and the opening in the hull when the former is withdrawn, to permit the removal of said cell without the ingress of water, a housing adapted to be attached to said valve casing, a screw in engagement with said housing and means for removably attaching said screw to said microphone cell to insert and withdraw said cell into and from said outer casing.

5. Submarine signaling apparatus comprising in combination, an outer casing adapted to be fixed in an opening in the hull of a ship and comprising a removable cover, a microphone cell removably housed in said casing and provided with a resilient diaphragm substantially flush with the hull of the ship and with the outer end of said casing, a microphone operatively connected with said diaphragm, said cover being adapted to close the inner end of said outer casing and located adjacent the end of said microphone cell when closed and a valve and casing therefor adapted to be attached to the inner end of said outer casing when said cover has been displaced and through which said microphone cell is withdrawn, said valve being adapted to be closed between said cell and the opening in the hull when the former is withdrawn, to permit the removal of said cell without the ingress of water, a housing adapted to be attached to said valve casing, a screw in engagement with said housing and a clutch on the inner end of said screw adapted to engage removably with said microphone cell to insert and withdraw said cell into and from said outer casing.

6. Submarine signaling apparatus comprising in combination, an outer casing adapted to be fixed in an opening in the hull of a ship and comprising a removable cover, a microphone cell removably housed in said casing and provided with a resilient diaphragm substantially flush with the hull of the ship and with the outer end of said casing, a microphone operatively connected with said diaphragm, said cover being adapted to close the inner end of said outer casing and located adjacent the end of said microphone cell when closed, and a valve and casing therefor adapted to be attached to the inner end of said outer casing when said cover has been displaced and through which said microphone cell is withdrawn, said valve being adapted to be closed between said cell and the opening in the hull when the former is withdrawn to permit the removal of said cell without the ingress of water, a housing adapted to be attached to said valve casing, a screw passing through said housing, means for removably attaching said screw to said microphone cell for withdrawing the same, a wheel having a screw-threaded nut engaging said screw, and means for increasing the force applied to said wheel.

7. Submarine signaling apparatus comprising in combination, an outer casing adapted to be fixed in an opening in the hull of a ship and comprising a removable cover, a microphone cell removably housed in said casing and provided with a resilient diaphragm substantially flush with the hull of the ship and with the outer end of said casing, a microphone operatively connected with said diaphragm, said cover being adapted to close the inner end of said outer casing and located adjacent the end of said microphone cell when closed, and a valve and casing therefor adapted to be attached to the inner end of said outer casing when said cover has been displaced and through which said microphone cell is withdrawn, said valve being adapted to be closed between said cell and the opening in the hull when the former is withdrawn to permit the removal of said cell without the ingress of water, a housing adapted to be attached to said valve casing, a hollow longitudinally movable member adapted to receive connecting conductors and passing through said housing, and means for removably attaching said member to said microphone cell for withdrawing the same.

8. Submarine signaling apparatus comprising in combination, an outer casing adapted to be fixed in an opening in the hull of a ship and comprising a removable cover, a microphone cell removably housed in said casing and provided with a resilient diaphragm substantially flush with the hull of the ship and with the outer end of said casing, a microphone operatively connected with said diaphragm, said cover being adapted to close the inner end of said outer casing and located adjacent the end of said microphone cell when closed, and a valve and casing therefor adapted to be attached to the inner end of said outer casing when said cover has been displaced and through which said microphone cell is withdrawn, said valve being adapted to be closed between said cell and the opening in the hull when the former is withdrawn to permit the removal of said cell without the ingress of water, a housing adapted to be attached to said valve casing, a hollow longitudinally movable screw adapted to receive conductors and passing through said housing, means for removably attaching said screw to said microphone cell for withdrawing the same, and means for moving said screw longitudinally.

9. Submarine signaling apparatus comprising in combination, an outer casing adapted to be fixed in an opening in the hull of a ship and comprising a removable cover, a microphone cell removably housed in said casing and provided with a resilient diaphragm substantially flush with the hull of the ship and with the outer end of said casing, a microphone operatively connected with said diaphragm, said cover being adapted to close the inner end of said outer casing and located adjacent the end of said microphone cell when closed, and a valve and casing therefor adapted to be attached to the inner end of said outer casing when said cover has been displaced and through which said microphone cell is withdrawn, said valve being adapted to be closed between said cell and the opening in the hull when the former is withdrawn to permit the removal of said cell without the ingress of water, a housing adapted to be attached to said valve casing, a longitudinally movable screw passing through said housing, means for removably attaching the inner end of said screw to said microphone cell for withdrawing the same, a ratchet wheel having a screw-threaded nut engaging said screw, a lever, and a pawl on said lever for rotating said ratchet wheel.

10. Submarine signaling apparatus comprising in combination, an outer casing adapted to be fixed in an opening in the hull of a ship and comprising a removable cover, a microphone cell removably housed in said casing and provided with a plurality of spaced arcuate projections on its inner end and provided with a resilient diaphragm substantially flush with the hull of the ship and with the outer end of said casing, a microphone operatively connected with said diaphragm, said cover being adapted to close the inner end of said outer casing and located adjacent the end of said microphone cell when closed, a valve and casing therefor adapted to be attached to the inner end of said outer casing when said cover has been displaced and through which said microphone cell is withdrawn, said valve being adapted to be closed between said cell and the opening in the hull when the former is withdrawn, to permit the removal of said cell without the ingress of water, a housing adapted to be attached to said valve casing, a longitudinally movable member passing through said housing, a clutch mounted on said member and provided with segmental members adapted to be inserted between said arcuate projections and rotated with respect thereto to engage said cell behind said arcuate projections, means for so engaging said members and locking means to prevent said clutch from rotating with respect to said cell.

11. Submarine signaling apparatus comprising in combination, an outer casing adapted to be fixed in an opening in the hull of a ship and comprising a removable cover, a microphone cell removably housed in said casing and provided with a plurality of spaced arcuate projections on its inner end and provided with a resilient diaphragm substantially flush with the hull of the ship and with the other end of said casing, a microphone operatively connected with said diaphragm, said cover being adapted to close the inner end of said outer casing and located adjacent the end of said microphone cell when closed, a valve and casing therefor adapted to be attached to the inner end of said outer casing when said cover has been displaced and through which said microphone cell is withdrawn, said valve being adapted to be closed between said cell and the opening in the hull when the former is withdrawn to permit the removal of said cell without the ingress of water, a housing adapted to be attached to said valve casing, a hollow member longitudinally movable in said housing, a clutch mounted on said hollow member and provided with segmental members adapted to be inserted between said arcuate projections and rotated with respect thereto to engage said cell behind said arcuate projections, means for so engaging said members, locking members slidable within said clutch and adapted to be positioned between said arcuate members to prevent said clutch from rotating with respect to said cell.

12. Submarine signaling apparatus comprising in combination, an outer casing adapted to be fixed in an opening in the hull of a ship and comprising a removable cover, a microphone cell removably housed in said casing and provided with a plurality of spaced arcuate projections on its inner end and provided with a resilient diaphragm substantially flush with the hull of the ship and with the other end of said casing, a microphone operatively connected with said diaphragm, said cover being adapted to close the inner end of said outer casing and located adjacent the end of said microphone cell when closed, a valve and casing therefor adapted to be attached to the inner end of said outer casing when said cover has been displaced and through which said microphone cell is withdrawn, said valve being adapted to be closed between said cell and the opening in the hull when the former is withdrawn to permit the removal of said cell without the ingress of water, a housing adapted to be attached to said valve casing, a hollow member longitudinally movable in said housing, a clutch mounted on said hollow member and provided with segmental members adapted to be inserted between said arcuate projections and rotated with respect thereto to engage said cell behind said arcuate projections, means for so engaging said members, locking members slidable within said clutch and adapted to be positioned between said arcuate members to prevent said clutch from rotating with respect to said cell, and means passing through said hollow member and adapted to move said locking members.

Signed at New York, N. Y., on this 14th day of April, 1925.

WILLIAM L. WALKER.